Oct. 2, 1956  L. NAUMANN ET AL  2,765,062
MULTIPLE UNIT CENTRIFUGAL CLUTCH
Filed Jan. 14, 1954  3 Sheets-Sheet 3
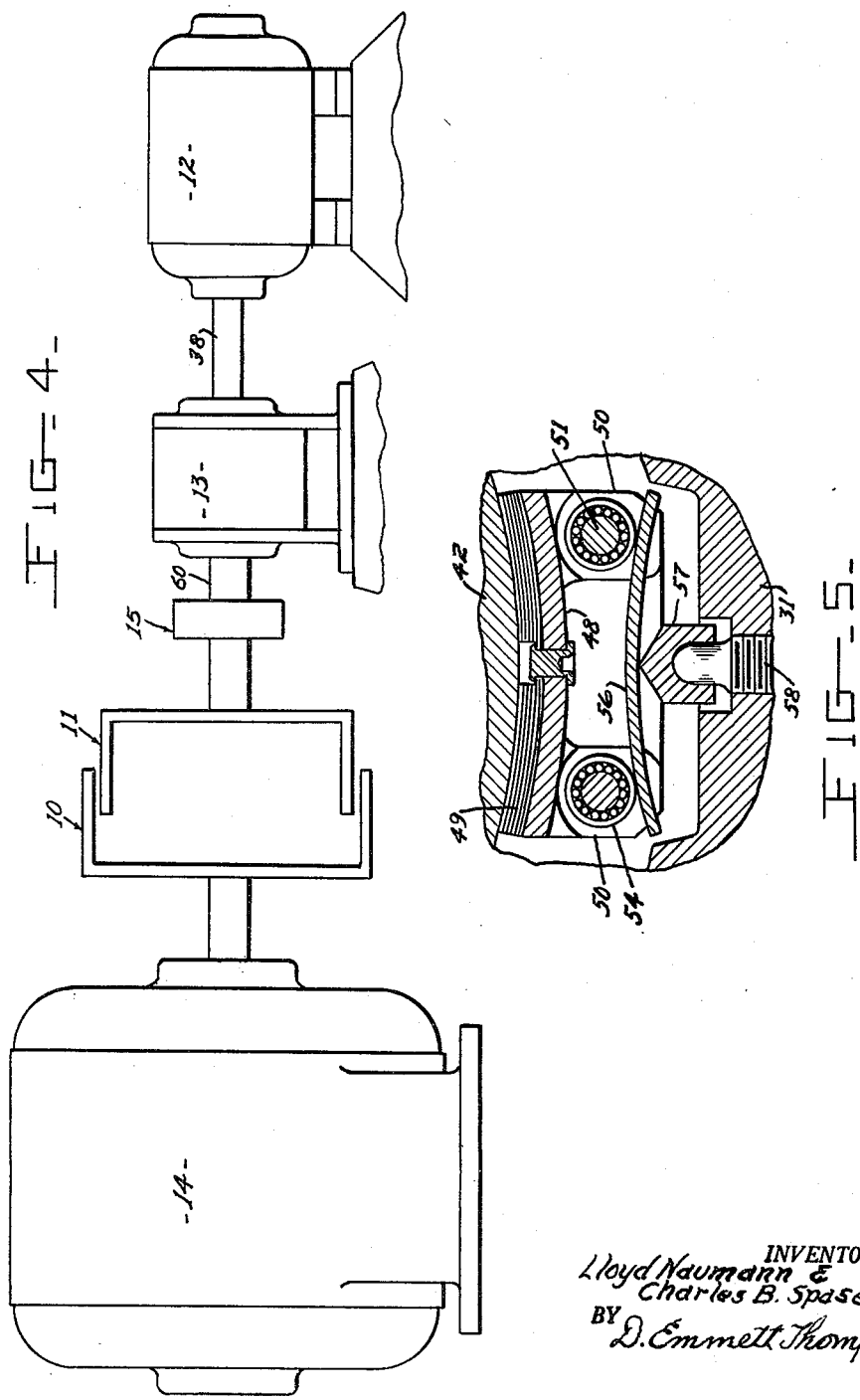
INVENTOR.
Lloyd Naumann &
Charles B. Spase
BY
D. Emmett Thompson
ATTORNEY

2,765,062
MULTIPLE UNIT CENTRIFUGAL CLUTCH

Lloyd Naumann, Euclid, Ohio, and Charles B. Spase, Nedrow, N. Y., assignors to Lipe-Rollway Corporation, Syracuse, N. Y., a corporation of New York Application January 14, 1954, Serial No. 404,025

5 Claims. (Cl. 192—104)

This invention relates to centrifgual clutches, and has as an object a centrifugal clutch embodying a particularly compact structural arrangement capable of transmitting a high torque for a substantial period of time.

The invention consists in the novel features and in the combinations and constructions hereinafter set forth and claimed.

In describing this invention, reference is had to the accompanying drawings in which like characters designate corresponding parts in all the views.

Figure 3 is a fragmentary sectional view taken on line 3—3, Figure 1.

Figure 4 is a diagrammatic view illustrating an installation in which the clutch may be embodied.

Figure 5 is an enlarged sectional view taken on line 5—5, Figure 1.

Figure 1:
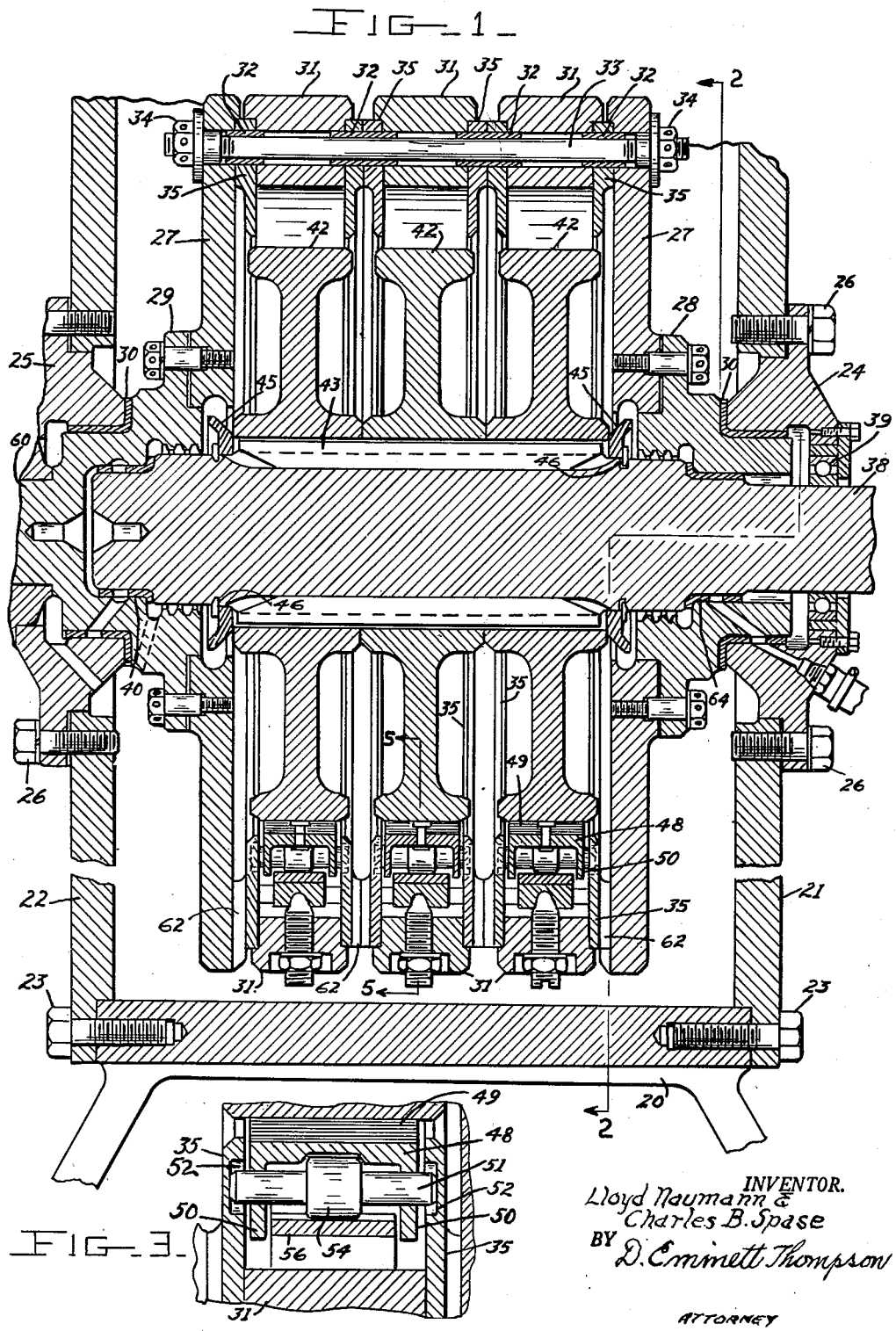
Figure 1 is a vertical sectional view of a clutch embodying our invention.
Figure 2:
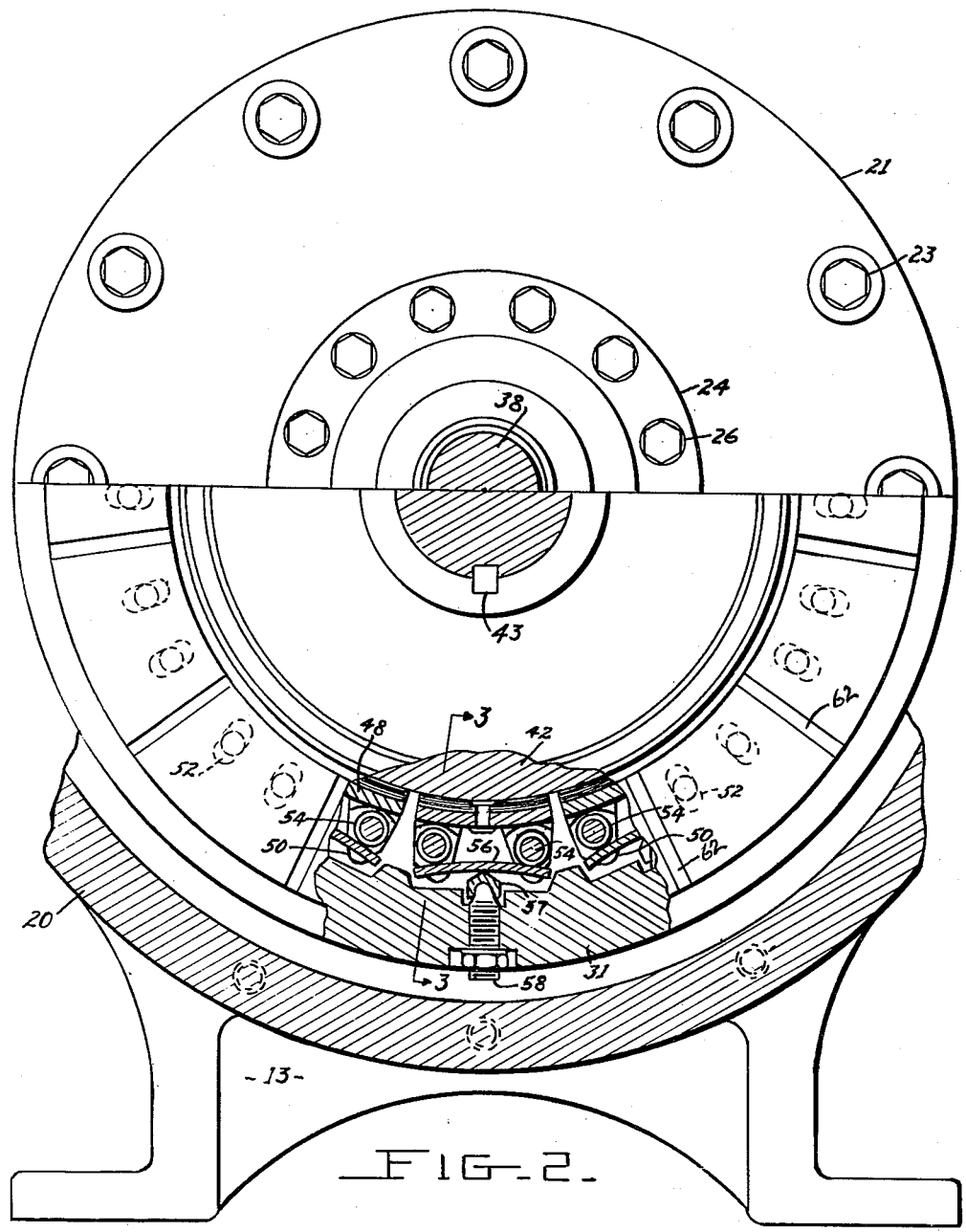
Figure 2 is a view taken on line 2—2, Figure 1, with parts broken away and parts in section.

The clutch is particularly adapted for connecting a starting motor to a fuel supply apparatus for supplying fuel to a gas operated turbine during the starting operation of the turbine. When the gas turbine reaches a predetermined speed, it becomes self sufficient in that if, at such speed, can effectively operate the fuel supply apparatus whereupon, said apparatus, through the medium of the centrifugally operated clutch, becomes disconnected from the starting motor, the normal operating speed of the gas turbine being much higher than the speed at which the starting motor operates the fuel supply apparatus, thus preventing the gas turbine from pulling the starting motor up to the operating speed of the turbine which would be excessive for the starting motor and likely to damage the same.

In the schematic arrangement shown in Figure 4, 10 designates generally the turbine, and 11 the air impeller supplying air under pressure to form the gaseous fuel mixture for the turbine. The impeller is connected to and initially driven by the starting motor, indicated at 12, through the centrifugal operated clutch of this invention, indicated at 13. The turbine 10 is connected to a generator 14. The drive between the centrifugal clutch 13 and the impeller 11 includes a centrifugally operated switch 15 to disconnect the starting motor 12 from the power supply when the impeller 11 is being driven by the turbine itself at a speed above a predetermined R. P. M.

The clutch structure consists of a cylindrical casing 20 having end walls 21, 22, detachably secured thereto, as by screws 23. The end walls 21, 22 are apertured centrally to receive annular bearing supports 24, 25, affixed to the end walls, as by screws 26. The driven member of the clutch is rotatably journalled in the bearing supports 24, 25. This structure comprises end disks 27 fastened to hub members 28, 29, having cylindrical portions rotatably mounted in bearings 30 carried by the supports 24, 25.

A plurality, in this case three, of annular members 31 are positioned intermediate the end plates 27 and are fixed thereto and to each other by dowel sleeves 32 through which tie rods 33 extend and on the ends of which are threaded nuts 34 to clamp the assembly together and to maintain the annular driven elements 31 concentric to the axis of the housing.

There is interposed intermediate the annular members 31 a pair of annular plates 35, and there is a similar plate 35 interposed between the end plates 27 and the outer annular members 31, these plates being also maintained in registration by the dowel sleeves 32.

The driving shaft 38 is journalled in a bearing 39 carried by the bearing cap 24, and the shaft extends axially of the housing and its inner end is journalled in a bearing 40 mounted in the hub 29 of the driven member. The shaft 38 has mounted on it and keyed thereto a series of driving drums 42, these being attached to the shaft 38, as by keys 43, and the drums are retained against axial movement by annular oil deflecting members 45 and snap rings 46.

Each of the annular driven members 31 carry an annular series of friction shoes 48, these being formed with an arcuate face confronting the drums 42 and having attached by rivets to said face a friction lining 49. The shoes 48 are formed at each end with a pair of spaced apart depending flanges 50 provided with alined apertures to receive pins 51. The ends of the pins 51 extend laterally of the flanges 50 into recesses 52 elongated in a direction radial from the center of the shaft 38, see Figures 1 and 3. These recesses 52 are formed in the annular plate members 35. A roller 54 is journalled on each of the pins 51 intermediate the ends thereof and is engaged by a flat spring member 56. The spring 56 is engaged intermediate its ends by an abutment 57 formed with a knife edge engaging the spring and being urged inwardly against the spring by an adjusting screw 58 threaded through the annular driven members 31.

With this arrangement, the friction shoes 48 are pressed inwardly against the peripheral face of the driving drums 42, whereby the torque is transmitted to the driven assembly. The hub 29 is formed with a shaft portion 60 connected to the impeller 11, the input shaft 38 being connected to the starting motor 12, Figure 4.

The annular plate members 35 are formed with radially extending slots 62, these slots being formed in the confronting sides of the members 35 positioned intermediate the members 31 and in the side of the members 35 confronting the end disk 27. The purpose of these slots 62 is to permit the free passage of any oil that may work inwardly from the bearings 40, 64, in which the shaft 38 is journalled, the oil being discharged radially outwardly through the slots 62 into the outer casing, thus minimizing the accumulation of oil on the friction faces of the drums 42.

In operation, the shaft 38 is rotated by the starting motor 12 and this rotation is imparted to the driven assembly through the friction shoes 48. When the clutch forms a part of the installation, as shown in Figure 4, the clutch is rotated at a speed up to 3900 R. P. M., the clutch is capable of transmitting sufficient torque to operate the impeller 11, and rotation of the impeller at this speed supplies gaseous fuel mixture to the turbine by which it may be started and operated.

When the turbine 10 thus becomes operative, its speed builds up to 7000 R. P. M. When the turbine reaches a speed over 3900 R. P. M. and accordingly, the speed of the impeller 11 and that of the clutch connected thereto, the friction shoes 48 under the centrifugal force at this speed of 3900 move outwardly and entirely release from the drums 42. Accordingly, as the turbine continues to increase its speed up to approximately 7000 R. P. M., this increase in speed is not imparted to the drums 42 and similarly, there is no load placed on the turbine in dragging the starting motor 12 up beyond its normal operating speed.

What we claim is:

1. A clutch structure comprising a stationary housing, driving and driven shafts journalled coaxially in said housing, a plurality of friction drums frictionally mounted in side by side relation on said driving shaft, said drums having peripheral friction faces, a driven member fixedly mounted on said driven shaft and encircling said drums in concentric spaced relation thereto, an annular set of friction shoes mounted in the driven member and encircling each of said drums, spring means carried by the driven member for pressing the friction shoes of each set against the friction face of the associated drum, said springs being loaded to release said shoes from the drums by centrifugal force when the driven member is rotated at a predetermined speed.

2. A clutch structure comprising a stationary housing, driving and driven shafts journalled coaxially in said housing, a plurality of friction drums fixedly mounted in side by side relation on said driving shaft, each of said drums having a peripheral friction face, an annular member encircling each of said drums in concentric spaced relation thereto, means detachably securing said annular members together and to the driven shaft, a circular series of friction shoes carried by each of said annular members, spring means carried by said annular members for pressing said friction shoes inwardly against the friction face of the associated drum, said springs being loaded to release said shoes from the drums by centrifugal force when said annular members are rotated at a predetermined speed.

3. A clutch structure comprising a stationary housing, driving and driven shafts journalled coaxially in said housing, an assemblage of friction drums fixedly mounted in side by side relation on said driving shaft, a disk arranged at each end of said assemblage, said disks being journalled for rotation about said driving shaft, an assemblage of annular members arranged between said disks, means operable for detachably securing said annular members to said disks and maintaining said members in concentric spaced relation to said drums, each of said annular members being provided with a circular series of friction shoes and having spring means urging said shoes into engagement with said friction drums, said spring means being loaded to release said shoes from the drums by centrifugal force when said annular members are rotated at a predetermined speed.

4. A clutch structure comprising a stationary housing, driving and driven shafts journalled coaxially in said housing, a plurality of friction drums fixedly mounted in side by side relation on said driving shaft, each of said drums having a peripheral friction face, an annular member encircling each of said drums in concentric spaced relation thereto, means detachably securing said annular members together and to the driven shaft, a circular series of friction shoes carried by each of said annular members, said friction shoes being provided with pins slidably mounted in radially extending slots formed in said annular members, spring means carried by said annular members for pressing said shoes inwardly against the friction face of the associated drum, said springs being loaded to release said shoes from the drums by centrifugal force when said annular members are rotated at a predetermined speed.

5. A clutch structure comprising a stationary housing, driving and driven shafts journalled coaxially in said housing, a plurality of friction drums fixedly mounted in side by side relation on said driving shaft, each of said drums having a peripheral friction face, an annular member encircling each of said drums in concentric spaced relation thereto, means detachably securing said annular members together and to the driven shaft, a circular series of friction shoes carried by each of said annular members, each of said friction shoes being provided with a pair of spaced apart pins slidably mounted in radially extending slots formed in said annular members, a flat spring member associated with each of said friction shoes, the end portions of said spring members engaging the pins of said shoes and fulcrum members carried by said annular members and engaging said spring members intermediate the ends thereof and being adjustable radially toward and from the drums to load said springs, whereby said shoes are released by centrifugal force from said drums when said annular members are rotated at a predetermined speed.

References Cited in the file of this patent

UNITED STATES PATENTS

| | | |
|---|---|---|
| 1,983,827 | Winther et al. | Dec. 11, 1934 |
| 2,306,158 | Ferguson et al. | Dec. 22, 1942 |
| 2,364,980 | Jimerson | Dec. 12, 1944 |
| 2,429,697 | Rawson | Oct. 28, 1947 |
| 2,678,031 | Spase et al. | May 11, 1954 |

FOREIGN PATENTS

| | | |
|---|---|---|
| 545,090 | France | July 12, 1922 |
| 104,628 | Austria | Nov. 10, 1926 |
| 496,800 | Great Britain | Dec. 6, 1938 |